US010850596B2

(12) United States Patent
Imanishi et al.

(10) Patent No.: US 10,850,596 B2
(45) Date of Patent: Dec. 1, 2020

(54) FUEL CELL SYSTEM FOR MOTOR VEHICLE AND CONTROL METHOD OF SAME

(71) Applicant: TOYOTA JIDOSHA KABUSHIKI KAISHA, Toyota (JP)

(72) Inventors: Masahiro Imanishi, Gotenba (JP); Yoshihiro Ohkuwa, Toyokawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 821 days.

(21) Appl. No.: 15/513,287

(22) PCT Filed: Jul. 30, 2015

(86) PCT No.: PCT/JP2015/071691
§ 371 (c)(1),
(2) Date: Mar. 22, 2017

(87) PCT Pub. No.: WO2016/047269
PCT Pub. Date: Mar. 31, 2016

(65) Prior Publication Data
US 2017/0305252 A1    Oct. 26, 2017

(30) Foreign Application Priority Data

Sep. 24, 2014 (JP) .................. 2014-194096

(51) Int. Cl.
*B60L 3/04* (2006.01)
*H02M 1/32* (2007.01)
(Continued)

(52) U.S. Cl.
CPC .................. *B60K 1/04* (2013.01); *B60L 3/04* (2013.01); *B60L 50/70* (2019.02);
(Continued)

(58) Field of Classification Search
CPC .......................... B60L 3/04; H02M 2001/322
(Continued)

(56) References Cited

U.S. PATENT DOCUMENTS 4,220,871 A * 9/1980 Yasui .................. B60R 21/0176
180/274
10,075,005 B2 * 9/2018 Fisher .................. H02J 7/0065
(Continued)

FOREIGN PATENT DOCUMENTS

JP      2003189415 A      7/2003
JP      2013027275 A      2/2013

*Primary Examiner* — Jerry D Robbins
(74) *Attorney, Agent, or Firm* — Hunton Andrews Kurth LLP

(57) ABSTRACT

A fuel cell system includes a fuel cell stack configured to supply power to an electric motor for driving a vehicle as well as generating power by an electrochemical reaction between a fuel gas and an oxidant gas, a discharge circuit and the discharge control circuit. The discharge circuit may form a plurality of discharge paths through which power generated in the fuel cell stack is discharged switching elements switching the connection relationships between resistance elements. The discharge control circuit form a second discharge path whose resistance value is smaller than the resistance value of the first discharge path and to switch the discharge through a first discharge path to discharge through the second discharge path when the detected voltage that is detected by the voltage detection unit is lower than a predetermined threshold voltage during the discharge through the first discharge path.

7 Claims, 15 Drawing Sheets

(51) Int. Cl.
*B60K 1/04* (2019.01)
*B60L 50/70* (2019.01)
*H01M 8/04302* (2016.01)
*H01M 8/04303* (2016.01)
*H01M 8/04537* (2016.01)
*H01M 8/04858* (2016.01)

(52) U.S. Cl.
CPC ... *H01M 8/04302* (2016.02); *H01M 8/04303* (2016.02); *H01M 8/04559* (2013.01); *H01M 8/04589* (2013.01); *H01M 8/0488* (2013.01); *H01M 8/0491* (2013.01); *H01M 2250/20* (2013.01); *H02M 2001/322* (2013.01); *Y02P 70/56* (2015.11); *Y02T 90/32* (2013.01)

(58) Field of Classification Search
USPC .......................................................... 320/135
See application file for complete search history.

(56) References Cited

U.S. PATENT DOCUMENTS

| | | | |
|---|---|---|---|
| 2003/0111971 A1 | 6/2003 | Ishikawa et al. | |
| 2011/0093148 A1* | 4/2011 | Kuehner | B60L 3/0046 |
| | | | 701/22 |
| 2012/0212160 A1* | 8/2012 | Shindo | B60L 3/0007 |
| | | | 318/139 |
| 2013/0214745 A1* | 8/2013 | Funaba | B60K 6/445 |
| | | | 320/166 |
| 2014/0106251 A1* | 4/2014 | Ohtani | H01M 8/04238 |
| | | | 429/432 |
| 2015/0162761 A1* | 6/2015 | Stanley | H02J 7/0029 |
| | | | 318/139 |

\* cited by examiner

FUEL CELL SYSTEM FOR MOTOR VEHICLE AND CONTROL METHOD OF SAME

CROSS-REFERENCE TO RELATED APPLICATIONS

This is a national phase application based on the PCT International Patent Application No. PCT/JP2015/071691 filed Jul. 30, 2015, claiming priority to Japanese Patent Application No. 2014-194096 filed Sep. 24, 2014, the entire contents of both of which are incorporated herein by reference.

FIELD

The present invention relates to a fuel cell system for a motor vehicle and a control method of the same.

BACKGROUND

A fuel cell system for a motor vehicle is publicly known, which includes a fuel cell stack that supplies power to an electric motor for driving a vehicle, as well as generating power as a result of an electrochemical reaction between a fuel gas and an oxidant gas, a switching element, a resistance element electrically connected to the fuel cell stack via the switching element, a discharge control circuit, and a collision detector (see Patent Document 1). In the fuel cell system for a motor vehicle described in Patent Document 1, when the collision detector detects a vehicle collision, the discharge control circuit discharges power generated in the fuel cell stack by turning on the switching element to electrically connect the fuel cell stack and the resistance element. In the fuel cell system for a motor vehicle described in Patent Document 1, the power generated in the fuel cell stack is discharged, when the collision detector detects a vehicle collision in order to prevent an operator from receiving an electric shock at the time of vehicle collision.

RELATED DOCUMENTS

Patent Document 1: Japanese Laid Open Patent Document No. 2013-027275

SUMMARY

Problem to be Solved by the Invention

When discharging power generated in the fuel cell stack at the time of vehicle collision, the fuel cell stack may be quickly discharged by reducing the resistance value of the resistance element. However, if the resistance value of the resistance element is reduced, the discharge current that flows through the resistance element is large and the resistance element is heated abnormally, and therefore the resistance element may be broken and the fuel cell stack may no longer be discharged. Although the resistance element may be prevented from being heated abnormally by increasing the volume of the resistance element, attaching a heat dissipating plate to the resistance element, etc., the manufacturing cost may increase, since the size of the resistance element is increased, etc. Further, although the resistance element may be prevented from being heated abnormally by increasing the resistance value of the resistance element, the discharge time of the fuel cell stack may be lengthened if the resistance value of the resistance element is increased.

Means for Solving Problem

According to an aspect of the present invention, a fuel cell system for a motor vehicle is provided including:

a fuel cell stack that supplies power to an electric motor for driving a vehicle, as well as generating power by an electrochemical reaction between a fuel gas and an oxidant gas;

a discharge circuit having a plurality of resistance elements and a plurality of switching elements switching connection relationships between the plurality of resistance elements, and capable of forming a plurality of discharge paths through which power generated in the fuel cell stack is discharged by the plurality of switching elements switching the connection relationships between the plurality of resistance elements; and a discharge control circuit configured to control turning on and off of the plurality of switching elements, wherein the discharge control circuit has
 a discharge starting unit configured to start discharge through a first discharge path by forming the first discharge path in the discharge circuit when a discharge instruction signal indicating instructions to discharge the power generated in the fuel cell stack is input;
 a voltage detection unit configured to detect a detected voltage corresponding to an output voltage of the fuel cell stack; and
 a path switching unit configured to form a second discharge path whose resistance value is smaller than the resistance value of the first discharge path in the discharge circuit when the detected voltage that is detected by the voltage detection unit is lower than a predetermined threshold voltage during the discharge through the first discharge path, and to switch the discharge through the first discharge path to discharge through the second discharge path.

According to another aspect of the present invention, a control method of a fuel cell system for a motor vehicle is provided including:

a fuel cell stack that supplies power to an electric motor for driving a vehicle, as well as generating power by an electrochemical reaction between a fuel gas and an oxidant gas;

a discharge circuit having a plurality of resistance elements and a plurality of switching elements switching connection relationships between the plurality of resistance elements, and capable of forming a plurality of discharge paths through which power generated in the fuel cell stack is discharged by the plurality of switching elements switching the connection relationships between the plurality of resistance elements; and a discharge control circuit configured to control turning on and off of the plurality of switching elements, the control method including:

starting, by the discharge control circuit, discharge through a first discharge path by forming the first discharge circuit in the discharge control circuit when a discharge instruction signal indicating instructions to discharge the power generated in the fuel cell stack is input, detecting, by the discharge control circuit, a detected voltage corresponding to an output voltage of the fuel cell stack, and forming, by the discharge control circuit, a second discharge path whose resistance value is smaller than the resistance value of the first discharge path when the detected voltage that is detected is lower than a predetermined threshold voltage and switching the discharge through the first discharge path to discharge through the second discharge path.

Effect of the Invention

A fuel cell system capable of quickly discharging power generated in a fuel cell stack as well as preventing a resistance element from being heated abnormally at the time of discharge while suppressing manufacturing cost may be provided.

BRIEF DESCRIPTION OF THE DRAWINGS

FIGS. 5A to 5C are circuit block diagrams illustrating connection states of the discharge circuit illustrated in FIG. 4, wherein FIG. 5A is a diagram illustrating a connection state before a collision signal is input to the discharge control circuit, FIG. 5B is a diagram illustrating a first connection state after the collision signal is input to the discharge control circuit, and FIG. 5C is a diagram illustrating a second connection state after the collision signal is input to the discharge control circuit;

EMBODIMENTS FOR EMBODYING THE INVENTION

A fuel cell system for a motor vehicle has a discharge circuit and a discharge control circuit. The discharge circuit has a plurality of resistance elements and a plurality of switching elements switching connections between the plurality of resistance elements, and by the plurality of switching elements switching the connections between the plurality of resistance elements, a plurality of discharge paths through which power generated in a fuel cell stack is discharged is formed. The discharge control circuit has a voltage detection unit, a discharge starting unit, and a path switching unit, and controls the plurality of switching elements. The voltage detection unit detects a detected voltage in relation to the output voltage of the fuel cell stack, and the discharge starting unit starts discharge through a first discharge path by forming the first discharge path in the discharge circuit, when acquiring discharge instructions to discharge charges charged in the fuel cell stack. The discharge control circuit forms a second discharge path whose resistance value is smaller than the resistance value of the first discharge path, when the detected voltage that is detected by the voltage detection unit is lower than a threshold voltage, and switches the discharge through the first discharge path to discharge through the second discharge path. Thus, in the fuel cell system for a motor vehicle, power generated in the fuel cell stack may be quickly discharged, as well as the resistance element may be prevented from being heated abnormally at the time of discharge while suppressing manufacturing cost.

Figure 1:
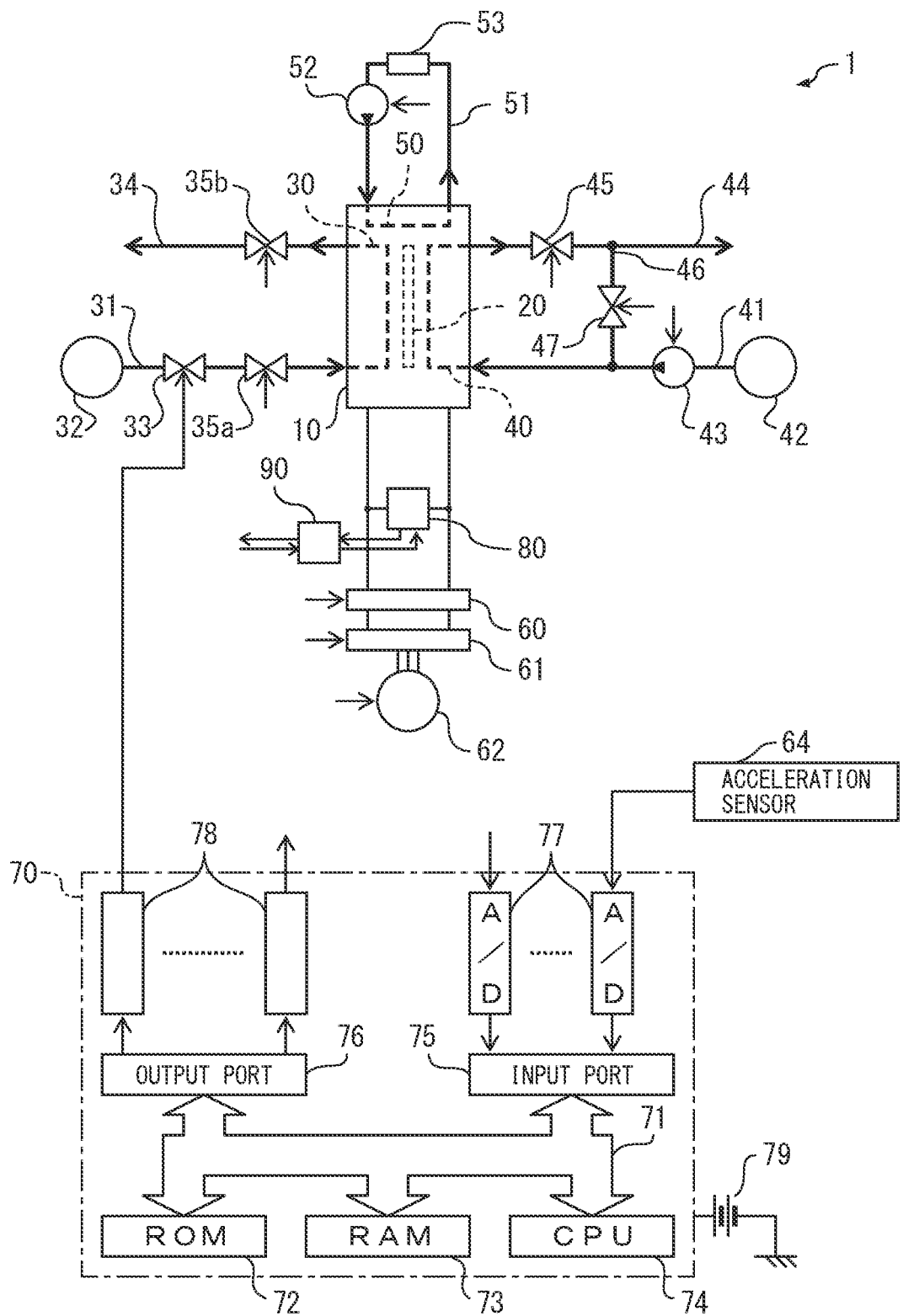
FIG. 1 is a general diagram of a fuel cell system for a motor vehicle.

FIG. 1 is a general diagram of a fuel cell system for a motor vehicle according to an embodiment.

A fuel cell system 1 that is mounted on a motor vehicle includes a fuel cell stack 10. The fuel cell stack 10 includes a plurality of fuel cell unit cells stacked in the stacking direction. In one example, the number of fuel cell unit cells is 350 to 400. Each fuel cell unit cell includes a membrane electrode assembly 20. The membrane electrode assembly 20 includes a membrane electrolyte, an anode formed on one side of the electrolyte, and a cathode formed on the other side of the electrolyte. Further, within each fuel cell unit cell, a fuel gas flow passage for supplying a fuel gas to the anode, an oxidant gas flow passage for supplying an oxidant gas to the cathode, and a cooling water flow passage for supplying cooling water to the fuel cell unit cell are formed, respectively. A fuel gas passage 30, an oxidant gas passage 40, and a cooling water passage 50 are formed in the fuel cell stack 10 by connecting the fuel gas flow passage, the oxidant gas flow passage, and the cooling water flow passage of the plurality of fuel cell unit cells in series, respectively. In the embodiment illustrated in FIG. 1, the volume of the fuel gas passage 30 and the volume of the oxidant gas passage 40 are substantially equal to each other within the fuel cell stack 10. In the motor vehicle, a passenger compartment (not illustrated) and an accommodation compartment (not illustrated) formed outside the passenger compartment in the direction of the vehicle length are formed and a part or the whole of the elements of the fuel cell system 1 is accommodated within the accommodation compartment.

A fuel gas supply path 31 is linked to the entrance of the fuel gas passage 30, and the fuel gas supply path 31 is linked to a fuel gas source 32 storing the fuel gas. In the embodiment according to the present invention, the fuel gas is formed by hydrogen and the fuel gas source 32 is formed by a hydrogen tank. An electromagnetic fuel gas control valve 33 that controls the amount of the fuel gas flowing within the fuel gas supply path 31 is arranged within the fuel gas supply path 31. On the other hand, an anode off-gas passage 34 is linked to the exit of the fuel gas passage 30. When the fuel gas control valve 33 is opened, the fuel gas within the fuel gas source 32 is supplied into the fuel gas passage 30 within the fuel cell stack 10 via the fuel gas supply path 31. At this time, the gas flowing out of the fuel gas passage 30, i.e., the anode off-gas, flows into the anode off-gas passage 34. Further, electromagnetic fuel gas sealing valves 35a and 35b are arranged in the fuel gas supply path 31 adjacent to the entrance of the fuel gas passage 30 and in the anode off-gas passage 34 adjacent to the exit of the fuel gas passage 30, respectively. Normally, the fuel gas sealing valves 35a and 35b are open.

An oxidant gas supply path 41 is linked and the oxidant gas supply path 41 is linked to an oxidant gas source 42. In the embodiment according to the present invention, the oxidant gas is formed by air and the oxidant gas source 42 is formed by the atmosphere. An oxidant gas supplier or a compressor 43 that compresses and sends an oxidant gas is arranged within the oxidant gas supply path 41. On the other hand, a cathode off-gas passage 44 is linked to the exit of the oxidant gas passage 40. When the compressor 43 is driven, the oxidant gas within the oxidant gas source 42 is supplied into the oxidant gas passage 40 within the fuel cell stack 10 via the oxidant gas supply path 41. At this time, the gas flowing out of the oxidant gas passage 40, i.e., the cathode off-gas, flows into the cathode off-gas passage 44. An electromagnetic cathode off-gas control valve 45 that controls the amount of the cathode off-gas that flows within the cathode off-gas passage 44 is arranged within the cathode off-gas passage 44. Further, the oxidant gas passage 40 located downstream of the compressor 43 and the cathode off-gas passage 44 located downstream of the cathode off-gas control valve 45 are linked to each other by a stack bypass passage 46, and within the stack bypass passage 46, an electromagnetic stack bypass control valve 47 that controls the amount of the oxidant gas that flows within the stack bypass passage 46 is arranged. When the stack bypass control valve 47 is opened, a part or the whole of the oxidant gas ejected from the compressor 43 flows into the cathode off-gas passage 44 through the stack bypass passage 46, i.e., by bypassing the fuel cell stack 10. In the embodiment illustrated in FIG. 1, even if the opening of the cathode off-gas control valve 45 is the minimum opening, a small amount of the oxidant gas or air may pass through the cathode off-gas control valve 45. Further, a small amount of the oxidant gas or air may pass through the compressor 43, when the compressor 43 is not in operation.

Further referring to FIG. 1, one end of a cooling water supply path 51 is linked to the entrance of the cooling water passage 50, and to the exit of the cooling water supply path 51, the other end of the cooling water supply path 51 is linked. A cooling water pump 52 that compresses and sends cooling water and a radiator 53 are arranged within the cooling water supply path 51. When the cooling water pump 52 is driven, the cooling water ejected from the cooling water pump 52 flows into the cooling water passage 50 within the fuel cell stack 10 via the cooling water supply path 51, and then flows into the cooling water supply path 51 through the cooling water passage 50 and returns to the cooling water pump 52.

The anode and the cathode of the fuel cell unit cell are electrically connected in series, respectively, and form electrodes of the fuel cell stack 10. Both the electrodes of the fuel cell stack 10 are electrically connected to a step-up converter 60 for stepping up the voltage from the fuel cell stack 10, the step-up converter 60 is electrically connected to an inverter 61 for converting the direct current from the step-up converter 60 into an alternating current, and the inverter 61 is electrically connected to a motor generator 62. Further, a discharge circuit 80 is electrically connected to both of the electrodes of the fuel cell stack 10. The discharge circuit 80 is controlled by a discharge control circuit 90.

Further referring to FIG. 1, the fuel cell system 1 includes a system control circuit 70. The system control circuit 70 is a digital computer and includes a ROM (Read Only Memory) 72, a RAM (Random Access Memory) 73, a CPU (microprocessor) 74, an input port 75, and an output port 76, which are connected to one another by a bidirectional bus 71. An acceleration sensor 64 that detects acceleration of a vehicle is attached to the motor vehicle. The output voltage of the above-described acceleration sensor 64 is input to the input port 75 via a corresponding AD converter 77. On the other hand, the output port 76 is electrically connected to the fuel gas control valve 33, the fuel gas sealing valves 35a and 35b, the compressor 43, the cathode off-gas control valve 45, the stack bypass control value 47, the cooling water pump 52, the step-up converter 60, the inverter 61, and the motor generator 62 via a corresponding drive circuit 78. Further, the power source of the system control circuit 70 includes another power source 79 different form the fuel cell stack 10.

When power needs to be generated in the fuel cell stack 10, the fuel gas control valve 33 is opened and the fuel gas is supplied to the fuel cell stack 10. Further, the compressor 43 is driven and the oxidant gas is supplied from the compressor 43 to the fuel cell stack 10. Then, an electrochemical reaction between the fuel gas and the oxidant gas occurs in the fuel cell unit cell, and power is generated. The generated power is sent to the motor generator 62. Then, the motor generator 62 is operated as an electric motor for driving a vehicle, and the vehicle is driven.

In the embodiment illustrated in FIG. 1, a vehicle collision is detected as follows. When the acceleration of the vehicle that is detected by the acceleration sensor 64 is greater than an allowed upper limit, it is determined that a vehicle collision has occurred, and when the vehicle acceleration is equal to or less than the allowed upper limit, it is determined that no vehicle collision has occurred. When a vehicle collision is detected, a collision signal is output to the discharge control circuit 90. Once a collision signal is output, outputting of the collision signal continues. On the other hand, when no vehicle collision is detected, no collision signal is output. In this manner, the acceleration sensor 64 and the system control circuit 70 constitute a collision detector that detects a vehicle collision and outputs a collision signal.

Figure 2:
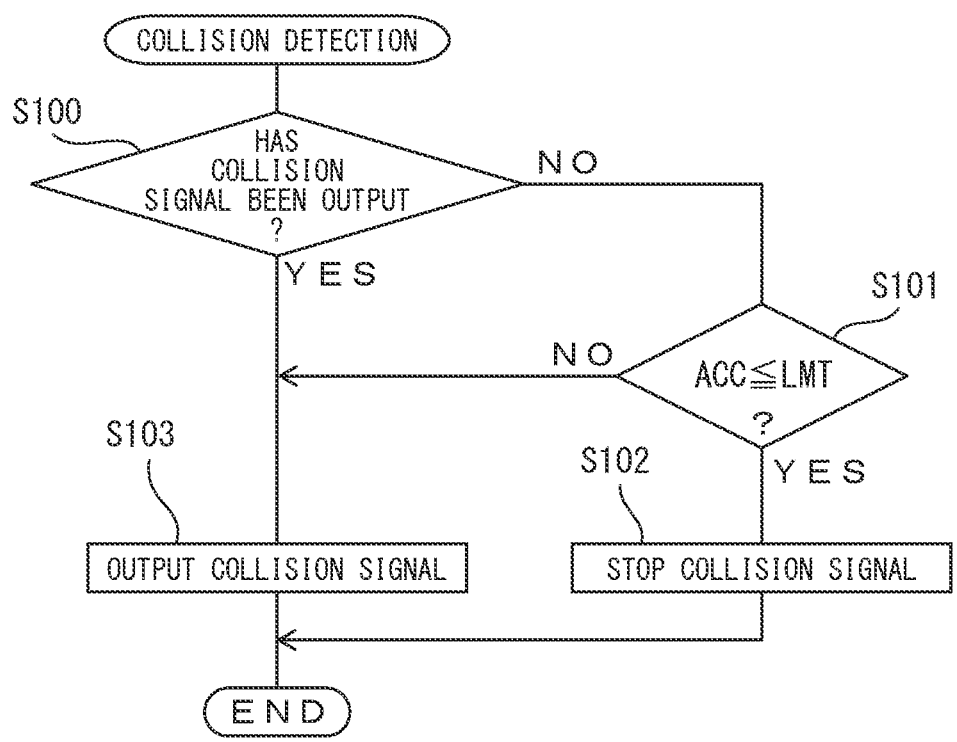
FIG. 2 is a flowchart illustrating a processing flow for performing detection of a vehicle collision of the fuel cell system for a motor vehicle illustrated in FIG. 1.

FIG. 2 is a flowchart illustrating a processing flow for performing the detection of a vehicle collision described above. The processing flow illustrated in FIG. 2 is performed by an interrupt that is caused to occur at each set time determined in advance in the system control circuit 70.

First, the system control circuit 70 determines whether a collision signal has been output or not (S100). If no collision signal has been output, the system control circuit 70 determines whether acceleration ACC of the vehicle is equal to or less than an allowed upper limit LMT or not (S101). If ACC≤LMT is satisfied, the state where no collision signal is output is continued (S102). If ACC>LMT is satisfied, the system control circuit 70 outputs a collision signal (S103). Further, when it is determined that a collision signal has been output at S100, the system control circuit 70 continues outputting of the collision signal (S104).

Figure 3:
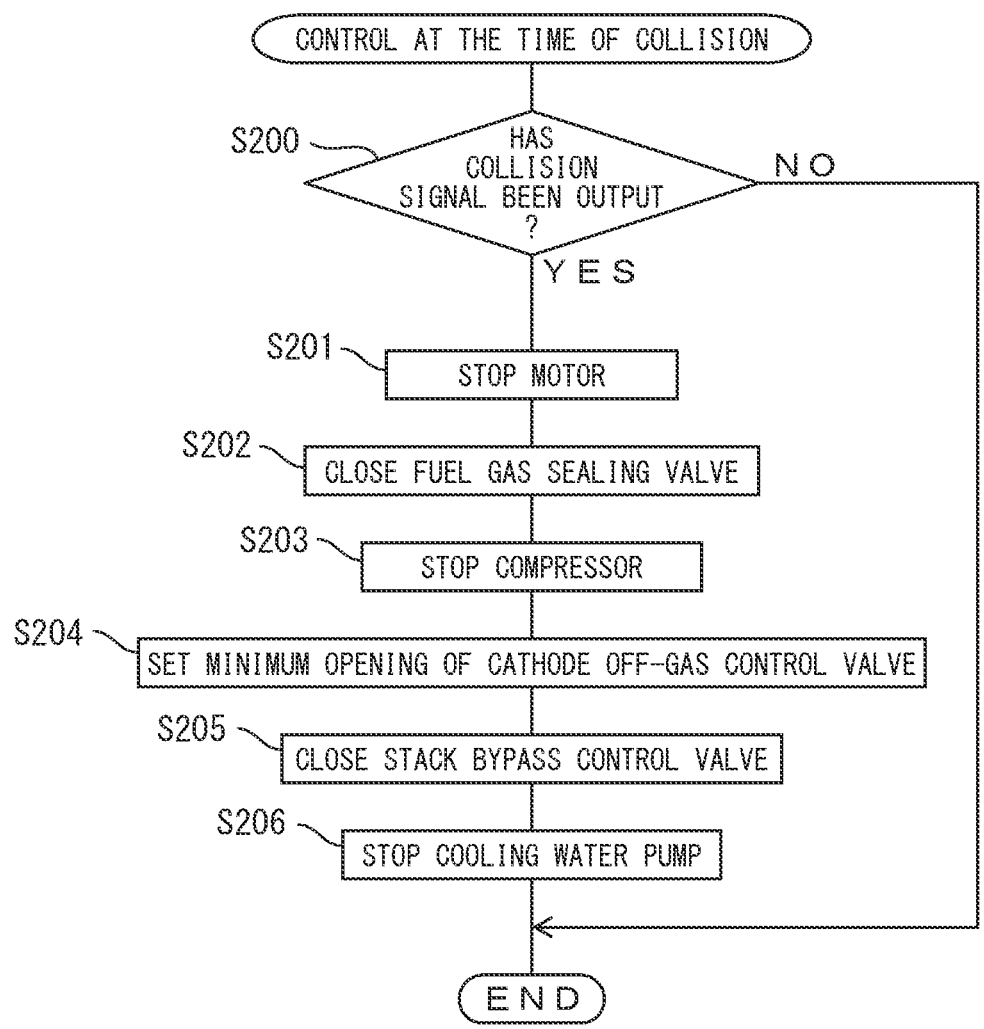
FIG. 3 is a flowchart illustrating a processing flow for performing control at the time of collision of the fuel cell system for a motor vehicle illustrated in FIG. 1.

FIG. 3 is a flowchart illustrating a processing flow for performing control at the time of collision in the embodiment. The processing flow illustrated in FIG. 3 is performed by an interrupt that is caused to occur at each set time determined in advance in the system control circuit 70.

First, the system control circuit 70 determines whether a collision signal has been output or not (S200). If no collision signal has been output, the processing cycle is terminated. If a collision signal has been output, the system control circuit 70 stops the motor generator 62 (S201) and closes the fuel gas sealing valves 35*a* and 35*b* (S202). The supply of the fuel gas to the fuel cell stack 10 is stopped and the fuel gas is prevented from flowing out of the fuel cell stack 10, by closing the fuel gas sealing valves 35*a* and 35*b*. Next, the system control circuit 70 stops the compressor 43 (S203), sets the opening of the cathode off-gas control value 45 to the minimum opening (S204), and closes the stack bypass control valve 47 (S205). The supply of the oxidant gas to the fuel cell stack 10 is stopped and the oxidant gas is prevented from flowing out of the fuel cell stack 10, by stopping the compressor 43, setting the opening of the cathode off-gas control value 45 to the minimum opening, and closing the stack bypass control valve 47. Then, the system control circuit 70 stops the cooling water pump 52 (S206). Then, the generation of power in the fuel cell stack 10 is stopped.

Figure 4:
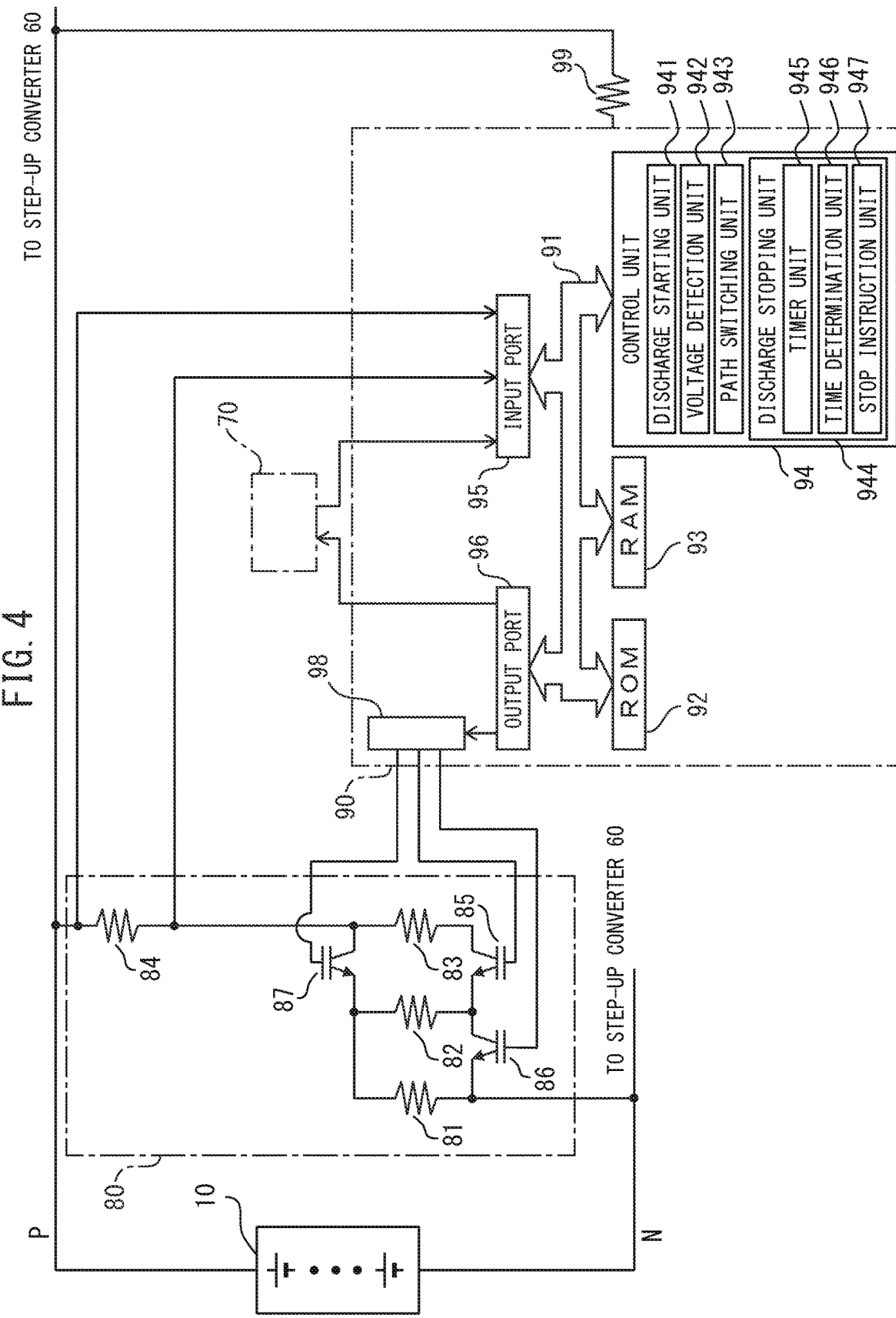
FIG. 4 is a detailed circuit block diagram of a discharge circuit and a discharge control circuit of the fuel cell system for a motor vehicle illustrated in FIG. 1.

FIG. 4 is a detailed circuit block diagram of the discharge circuit 80 and the discharge control circuit 90. The discharge circuit 80 and the discharge control circuit 90 form a quick discharge device that quickly discharges power generated in the fuel cell stack 10.

The discharge circuit 80 includes a first resistance element 81 to a fourth resistance element 84, and a first switching element 85 to a third switching element 87. The resistance value of the first resistance element 81 to the fourth resistance element 84 is equal to one another and in one example, the resistance value of the first resistance element 81 to the fourth resistance element 84 is 9Ω. In the example illustrated in FIG. 4, each of the first switching element 85 to the third switching element 87 includes an insulated gate bipolar transistor (IGBT). One end of the first resistance element 81 is electrically connected to the anode of the fuel cell stack 10 and to the emitter of the second switching element 86 and the other end of the first resistance element 81 is electrically connected to one end of the second resistance element 82 and to the emitter of the third switching element 87. The other end of the second resistance element 82 is electrically connected to the collector of the second switching element 86 and to the emitter of the first switching element 85. One end of the third resistance element 83 is electrically connected to the collector of the first switching element 85, and the other end of the third resistance element 83 is electrically connected to one end of the fourth resistance element 84 and to the collector of the third switching element 87. The other end of the fourth resistance element 84 is electrically connected to the cathode of the fuel cell stack 10. The gates of the first switching element 85 to the third switching element 87 are electrically connected to an output port 96 of the discharge control circuit 90 via a drive circuit 98. The voltages at both ends of the fourth resistance element 84 are input to an input port 95 of the discharge control circuit 90, respectively. The fourth resistance element 84 supplies a detected voltage in relation to the output voltage of the fuel cell stack 10 to the discharge control circuit 90. The detected voltage, which is the voltage across both ends of the fourth resistance element 84, fluctuates in proportion to fluctuations in the output voltage of the fuel cell stack 10, and therefore the discharge control circuit 90 may estimate the output voltage of the fuel cell stack 10 by detecting the detected voltage. In the present embodiment, although the detected voltage is used as the voltage corresponding to the output voltage of the fuel cell stack 10, which is the voltage across both ends of the fourth resistance element 84, the output voltage of the fuel cell stack 10 may be used as the corresponding voltage.

In the discharge circuit 80, a discharge path is formed, through which power generated in the fuel cell stack 10 is discharged via the first resistance element 81 to the third resistance element 83 by controlling the first switching element 85 to the third switching element 87 in accordance with the control signal from the discharge control circuit 90.

Figure 5A:
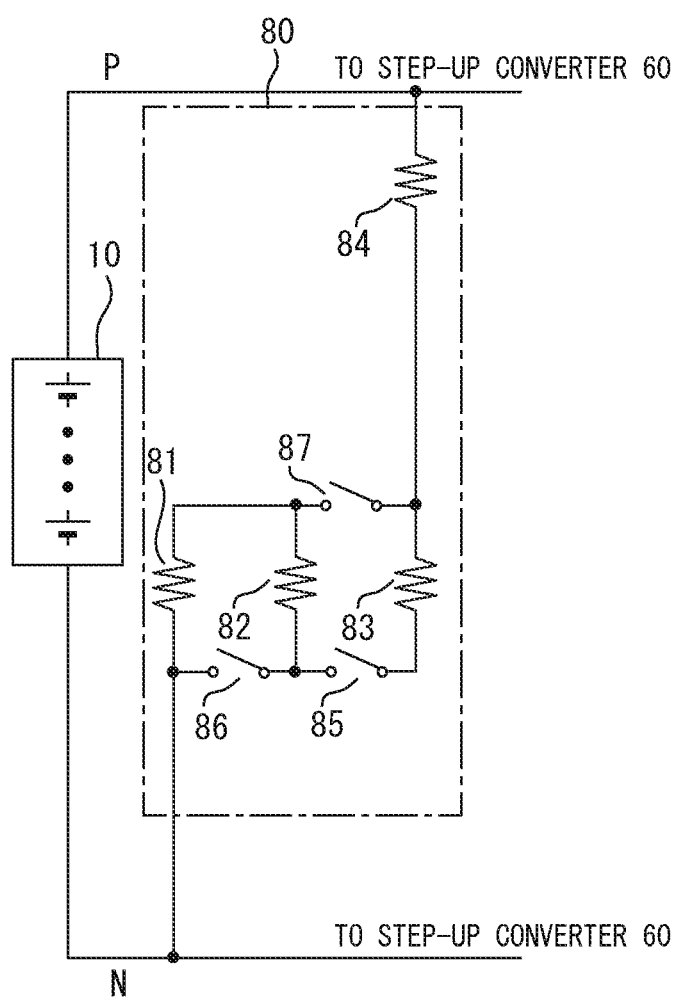
Figure 5B:
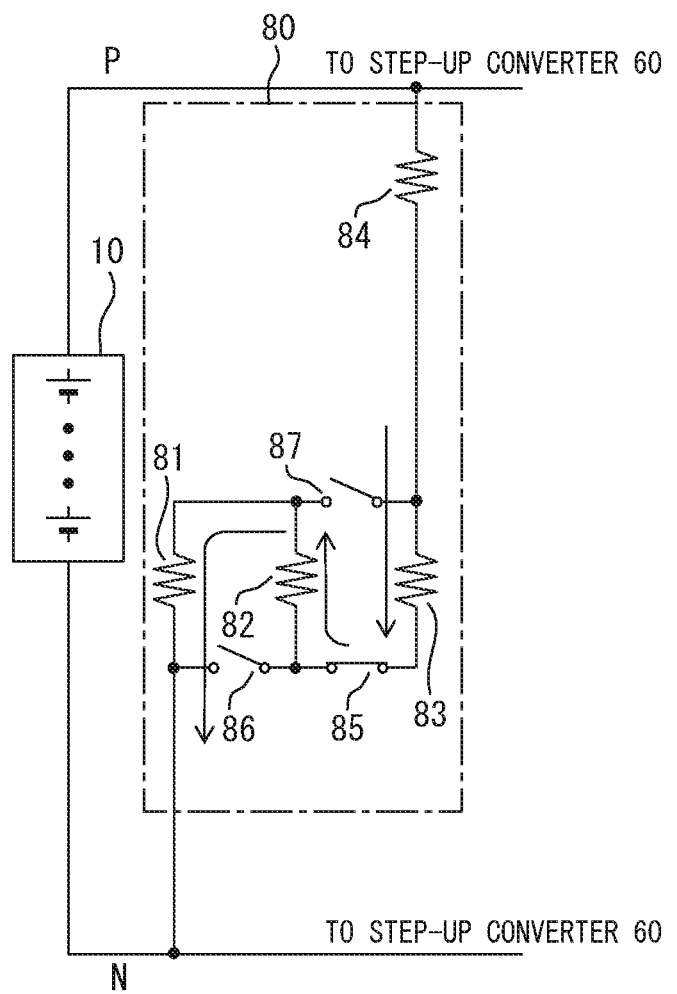
Figure 5C:
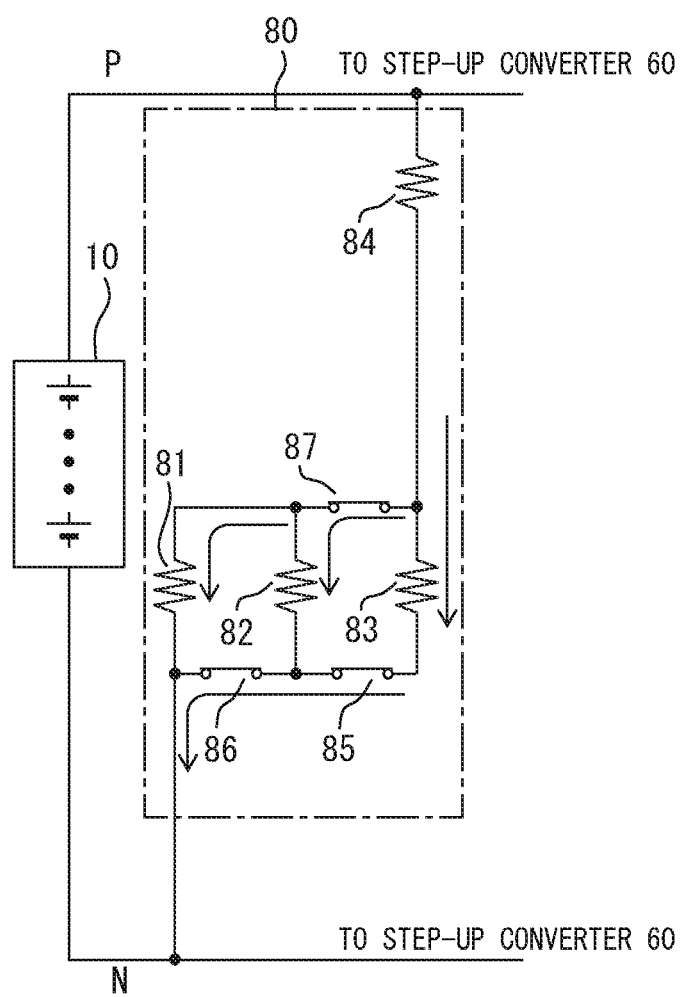

FIGS. 5A to 5C are circuit block diagrams illustrating connection states of the discharge circuit 80. FIG. 5A is a diagram illustrating a connection state before the collision signal is input, FIG. 5B is a diagram illustrating a first connection state after the collision signal is input, and FIG. 5C is a diagram illustrating a second connection state after the collision signal is input.

Before the collision signal is input to the discharge control circuit 90, all of the first switching element 85 to the third switching element 87 are in the off state, and therefore in the discharge circuit 80, the discharge path through which power generated in the fuel cell stack 10 is discharged is not formed. When the collision signal is input, the discharge control circuit 90 turns on the first switching element 85. When the first switching element 85 is turned on, the first resistance element 81 to the third resistance element 83 are connected in series and the discharge circuit 80 forms a first discharge path. When each resistance value of the first resistance element 81 to the third resistance element 83 is taken as R, the combined resistance of the first discharge path will be 3R. When the detected voltage that is supplied from the fourth resistance element 84 is lower than a predetermined threshold voltage, the discharge control circuit 90 turns on the second switching element 86 and the third switching element 87, in addition to the first switching element 85. When all of the first switching element 85 to the third switching element 87 are turned on, the first resistance element 81 to the third resistance element 83 are connected in parallel and the discharge circuit 80 forms a second discharge path. When each resistance value of the first resistance element 81 to the third resistance element 83 is taken to be R, the combined resistance of the second discharge path will be (⅓) R. The combined resistance of the first discharge path illustrated in FIG. 5B is 3R and the combined resistance of the second discharge path illustrated in FIG. 5C is (⅓) R, and therefore the combined resistance of the second discharge path is ⅑ of the combined resistance of the first discharge path. The discharge control circuit 90 controls the first switching element 85 to the third switching element 87 so as to increase the combined resistance of the discharge path, when the voltage of the fuel cell stack 10 is comparatively high, and to reduce the combined resistance of the discharge path, when the voltage of the fuel cell stack 10 is comparatively low.

The discharge control circuit 90 is a digital computer and includes a ROM (Read Only Memory) 92, a RAM (Random Access Memory) 93, a control unit 94, the input port 95, and the output port 96 connected to one another by a bidirectional bus 91. The control unit 94 comprehensively controls the general operation of the discharge control circuit 90 and is, for example, a CPU (microprocessor). The control unit 94 controls turning on and off of the first switching element 85 to the third switching element 87 by performing each piece of the processing in an appropriate procedure in accordance with programs, etc., stored in the ROM 92. The control unit 94 performs the processing based on the programs stored in the ROM 92. The input port 95 of the discharge control circuit 90 is electrically connected to the output port 76 of the system control circuit 70 and the output port 96 of the discharge control circuit 90 is electrically connected to the input port 75 of the system control circuit 70. In other words, the system control circuit 70 and the discharge control circuit 90 can communicate with each other. Further, the voltages at both ends of the fourth resistance element 84 are input to the input port 95 of the discharge control circuit 90.

In the example illustrated in FIG. 4, the power source of the discharge control circuit 90 includes the fuel cell stack 10. In other words, the discharge control circuit 90 is electrically connected to, for example, the cathode of the fuel cell stack 10 at all times via a resistance element. In this case, the output voltage of the fuel cell stack 10 is reduced down to the drive voltage of the discharge control circuit 90 by a resistance element 99 and then is sent to the discharge control circuit 90. The drive voltage of the discharge control circuit 90 is, for example, 24 volts.

The control unit 94 has a discharge starting unit 941, a voltage detection unit 942, a path switching unit 943, and a discharge stopping unit 944. The discharge stopping unit 944 has a timer unit 945, a time determination unit 946, and a stop instruction unit 947. Each of these units controlled by the control unit 94 is a function module packaged by a program that is executed on the processor controlled by the control unit 94. Alternatively, each of these units controlled by the control unit 94 may be packaged in the discharge control circuit 90 as an independent integrated circuit, a microprocessor, or firmware.

Figure 6:
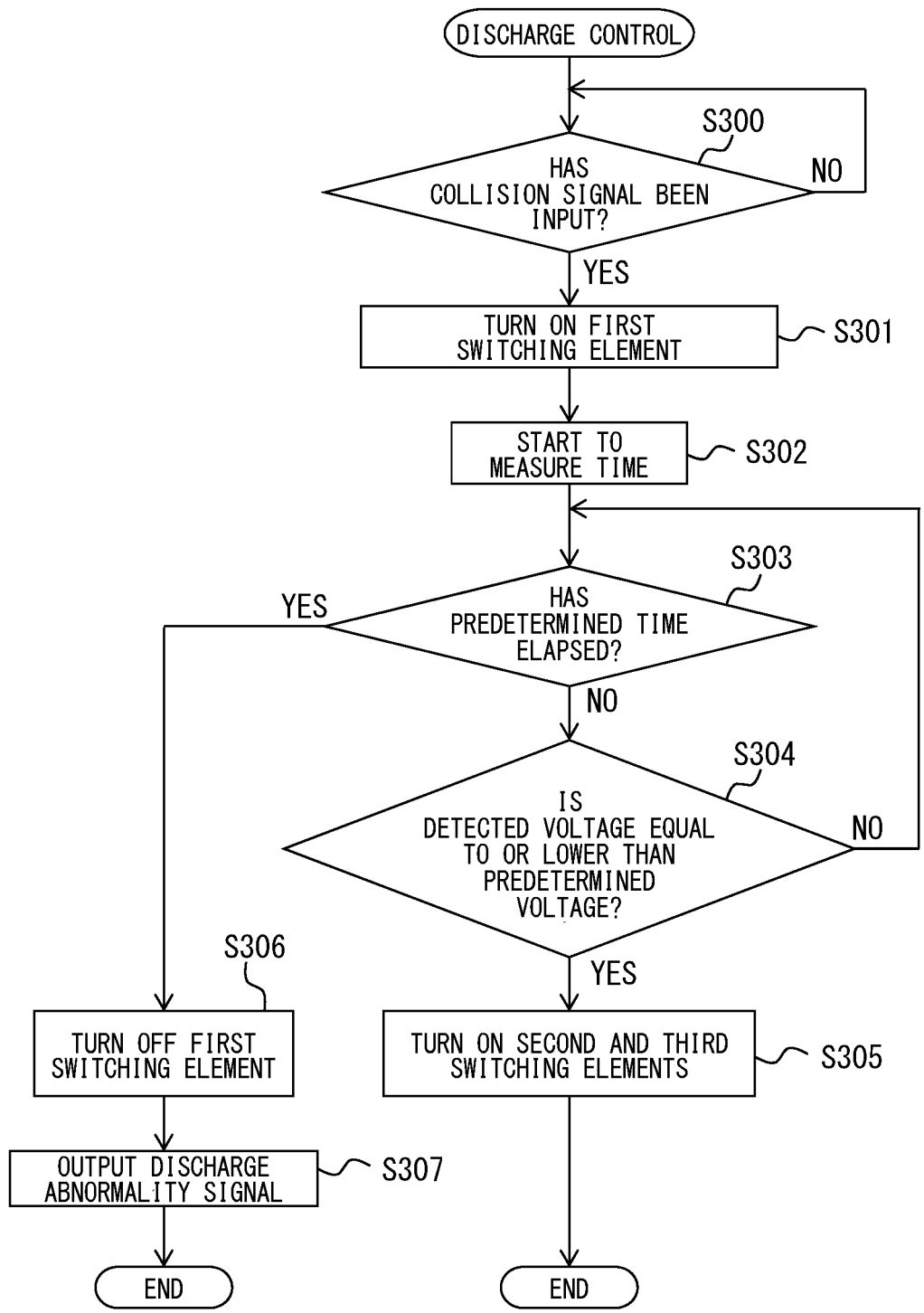
FIG. 6 is a flowchart illustrating a processing flow for performing discharge control of the fuel cell system for a motor vehicle illustrated in FIG. 1.

FIG. 6 is a flowchart illustrating a processing flow of processing to form a discharge path in the discharge circuit 80.

First, the discharge starting unit 941 determines whether a collision signal has been input or not (S300). If it is determined that a collision signal has not been input, the processing returns to S300 and if it is determined that a collision signal has been input, the processing proceeds to S301. When the processing proceeds to S301, the discharge starting unit 941 turns on the first switching element 85 and forms the first discharge path in which the first resistance element 81 to the third resistance element 83 are connected in series as illustrated in FIG. 5B. Next, the timer unit 945 starts to measure time (S302). Next, the time determination unit 946 determines whether a predetermined time has elapsed after the first switching element 85 is turned on and the first discharge path is formed (S303). In one example, the predetermined time is one second. If it is determined that the predetermined time has elapsed after the first discharge path is formed, the processing proceeds to S306, and if it is determined that the predetermined time has not elapsed after the first discharge path is formed, the processing proceeds to S304. When the processing proceeds to S304, the path switching unit 943 determines whether the detected voltage, which is the voltage across both ends of the fourth resistance element 84, detected by the voltage detection unit 924 is equal to or lower than a predetermined voltage. In one example, the predetermined voltage is the voltage corresponding to the detected voltage, when the output voltage of the fuel cell stack 10 is 300 V. If it is determined that the detected voltage is not equal to or lower than the predetermined voltage, the processing returns to S304, and if it is determined that the detected voltage is equal to or lower than the predetermined voltage, the processing proceeds to S305. When the processing proceeds to S305, the path switching unit 943 turns on the second switching element 86 and the third switching element 87 and forms the second discharge path in which the first resistance element 81 to the third resistance element 83 are connected in parallel as illustrated in FIG. 5C. The discharge through the first discharge path is switched to discharge through the second discharge path, by the path switching unit 943 forming the second discharge path during the discharge through the first discharge path. Then, when the voltage between the anode and cathode of the fuel cell stack 10, i.e., the output voltage, decreases down to the voltage corresponding to a predetermined control voltage, the processing is terminated.

If it is determined that the predetermined time has elapsed after the first discharge path is formed at S303, the stop instruction unit 947 turns off the first switching element 85 (S306). Next, the stop instruction unit 947 outputs a discharge abnormality signal indicating that the discharge processing has not been performed normally to the system control circuit 70 (S307).

The discharge control circuit 90 determines whether the amount of decrease in the detected voltage per predetermined time is larger than a threshold amount of decrease, by the determination processing at S303 and S304. When the amount of decrease in the detected voltage per predetermined time is smaller than the threshold amount of decrease, the discharge control circuit 90 outputs a discharge abnormality signal after turning off the first switching element 85 to shut off the first discharge path. For example, the fuel gas sealing valves 35a and 35b and the stack bypass control valve 47 may be not closed, the supply of the fuel gas and the oxidant gas to the fuel cell stack 10 may be continued, and the fuel cell stack 10 may continue to generate power, even if a collision signal has been input. If the fuel cell stack 10 continues to generate power after the collision signal is input, the output voltage of the fuel cell stack 10 does not decrease quickly and the first resistance element 81 to the third resistance element 83 forming the first discharge path may be heated or burned out. Because of this, the discharge control circuit 90 prevents the first resistance element 81 from being burned out by turning off the first switching element 85. Further, the discharge control circuit 90 enables an operator who deals with the collided vehicle to be notified of that the discharge processing of the fuel cell stack 10 has not been performed normally, by outputting a discharge abnormality signal.

Figure 7:
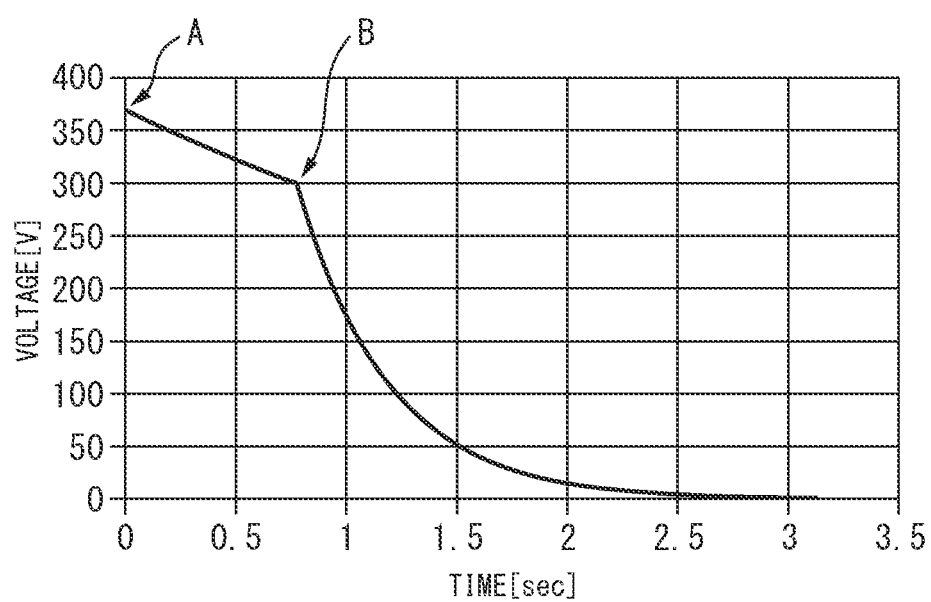
FIG. 7 is a diagram illustrating a change with the passage of time in the output voltage of a fuel cell stack in the discharge processing illustrated in FIG. 6.

FIG. 7 is a diagram illustrating a change with the passage of time in the output voltage of the fuel cell stack 10 in the discharge processing illustrated in FIG. 6. In FIG. 7, the horizontal axis represents the elapsed time after the discharge processing is started and the vertical axis represents the output voltage of the fuel cell stack 10. Further, in FIG. 7, the point in time indicated by arrow A indicates the point in time when the first switching element 85 turns on and the discharge processing starts, and the point in time indicated by arrow B indicates the point in time when the second switching element 86 and the third switching element 87 further turn on.

At the point in time of arrow A, if a collision signal is input, the discharge starting unit 941 turns on the first switching element 85 and forms the first discharge path in which the first resistance element 81 to the third resistance element 83 are connected in series as illustrated in FIG. 5B. In the example illustrated in FIG. 7, the voltage before the collision signal is input is about 370 V. Next, if the detected voltage is determined to be equal to or lower than a predetermined voltage at the point in time of arrow B, the path switching unit 943 turns on the second switching element 86 and the third switching element 87 and forms the second discharge path illustrated in FIG. 5C. In the example illustrated in FIG. 7, the voltage at which the second switching element 86 and the third switching element 87 are turned on is 300 V.

The discharge control circuit 90 suppresses the magnitude of the discharge current that flows through the discharge circuit 80, when the output voltage of the fuel cell stack 10 is high by forming the first discharge path whose combined resistance is comparatively high in the discharge circuit 80 immediately after the collision signal is input. Next, the discharge control circuit 90 quickly decreases the output voltage of the fuel cell stack 10 by forming the second discharge path whose combined resistance is comparatively low in the discharge circuit 80, when the output voltage of the fuel cell stack 10 is lower than the predetermined voltage.

Figure 8:
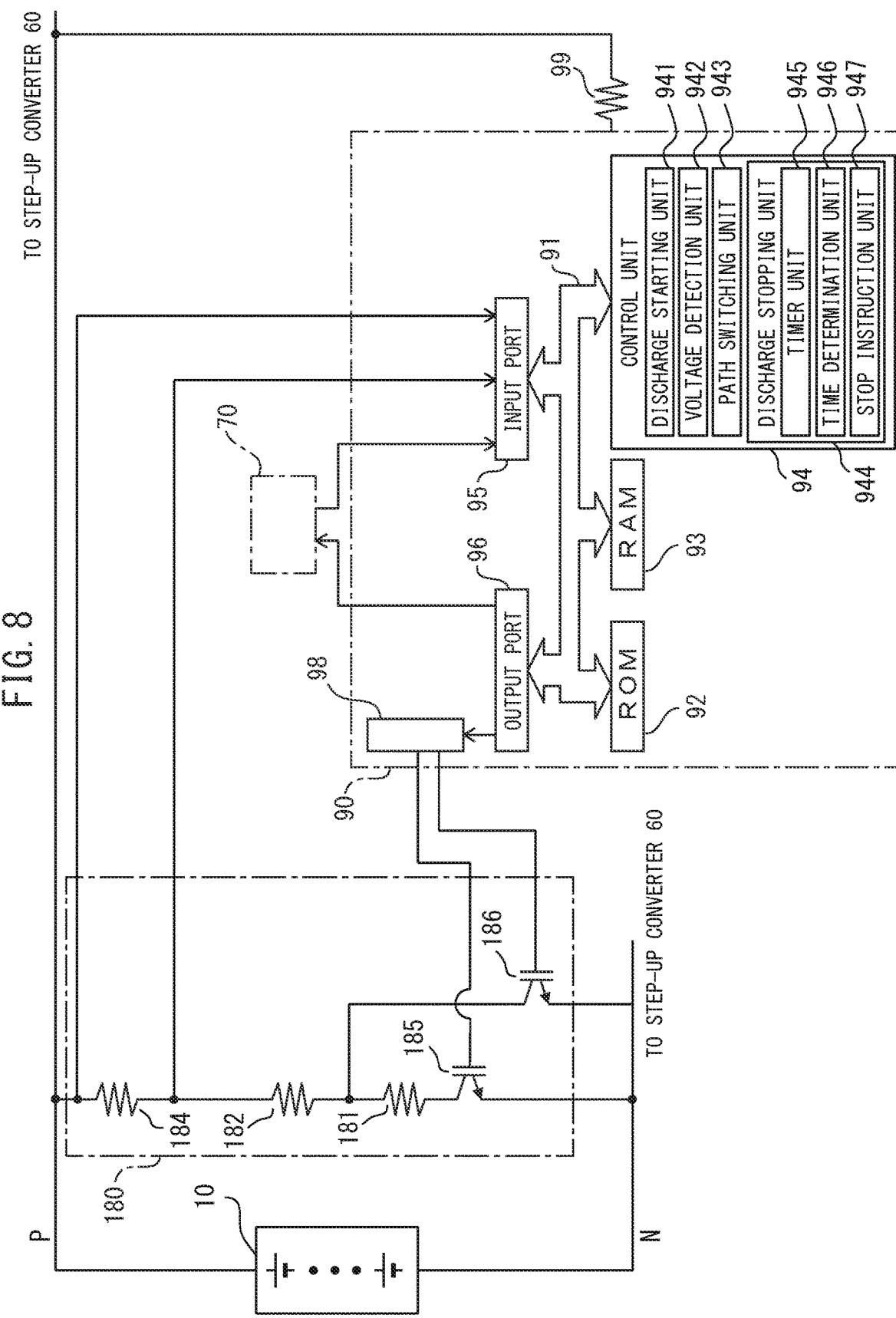
FIG. 8 is a detailed circuit block diagram of a discharge circuit and a discharge control circuit of a first modification example of the fuel cell system.

FIG. 8 is a detailed circuit block diagram of a discharge circuit and a discharge control circuit of a first modification example of the fuel cell system 1.

In the modification example illustrated in FIG. 8, a discharge circuit 180 is arranged in place of the discharge circuit 80 explained with reference to FIG. 4, FIG. 5, etc. The discharge circuit 180 has a first resistance element 181, a second resistance element 182, a fourth resistance element 184, which is a voltage detection element, a first switching element 185, and a second switching element 186. One end of the first resistance element 181 is electrically connected to the collector of the first switching element 185 and the other end of the first resistance element 181 is electrically connected to one end of the second resistance element 182 and to the collector of the second switching element 186. The other end of the second resistance element 182 is electrically connected to one end of the fourth resistance element 184. The other end of the fourth switching element 184 is electrically connected to the cathode of the fuel cell stack 10. The emitters of the first switching element 185 and the second switching element 186 are electrically connected to the anode of the fuel cell stack 10 and the gates of the first switching element 185 and the second switching element 186 are electrically connected to the output port 96 via the drive circuit 98. Each of the first resistance element 181 and the second resistance element 182 is formed so that the resistance value of the first resistance element 181 is greater than the resistance value of the second resistance element 182.

Figure 9:
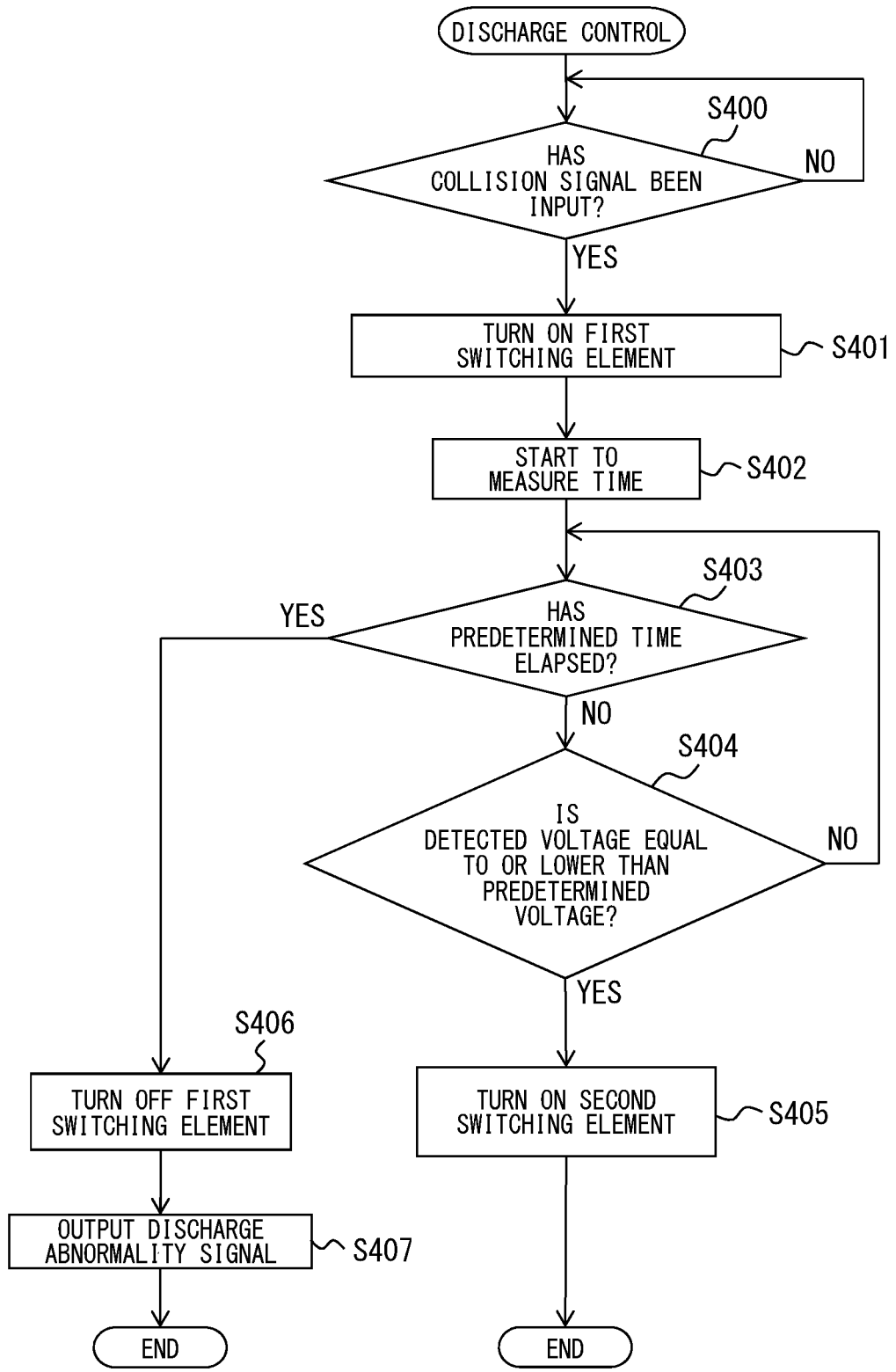
FIG. 9 is a flowchart illustrating a processing flow for performing discharge control in the modification example illustrated in FIG. 8.

FIG. 9 is a flowchart showing a processing flow for performing discharge control in the modification example illustrated in FIG. 18.

When it is determined that a collision signal has been input (S400), the discharge starting unit 941 turns on the first switching element 185 (S401) and forms a first discharge path in which the first resistance element 181 and the second resistance element 182 are connected in series in the discharge circuit 180. If the timer unit 945 starts to measure time (S402), the time determination unit 946 determines that the predetermined time has not elapsed after the first discharge path is formed (S403), and the path switching unit 943 determines that the detected voltage is equal to or lower than a predetermined voltage (S404), the processing proceeds to S405. When the processing proceeds to S405, the path switching unit 943 turns on the second switching element 186 and forms a second discharge path through which a discharge current flows from the second resistance element 182 via the second switching element 186. The combined resistance of the second discharge path that is formed by the second switching element 186 turning on is lower than the combined resistance of the first discharge path, since the second discharge path bypasses the first resistance element 181 whose resistance value is comparatively great. The processing at S406 and S407 is the same as the processing at S306 and S307, and therefore a detailed explanation is omitted.

Figure 10:
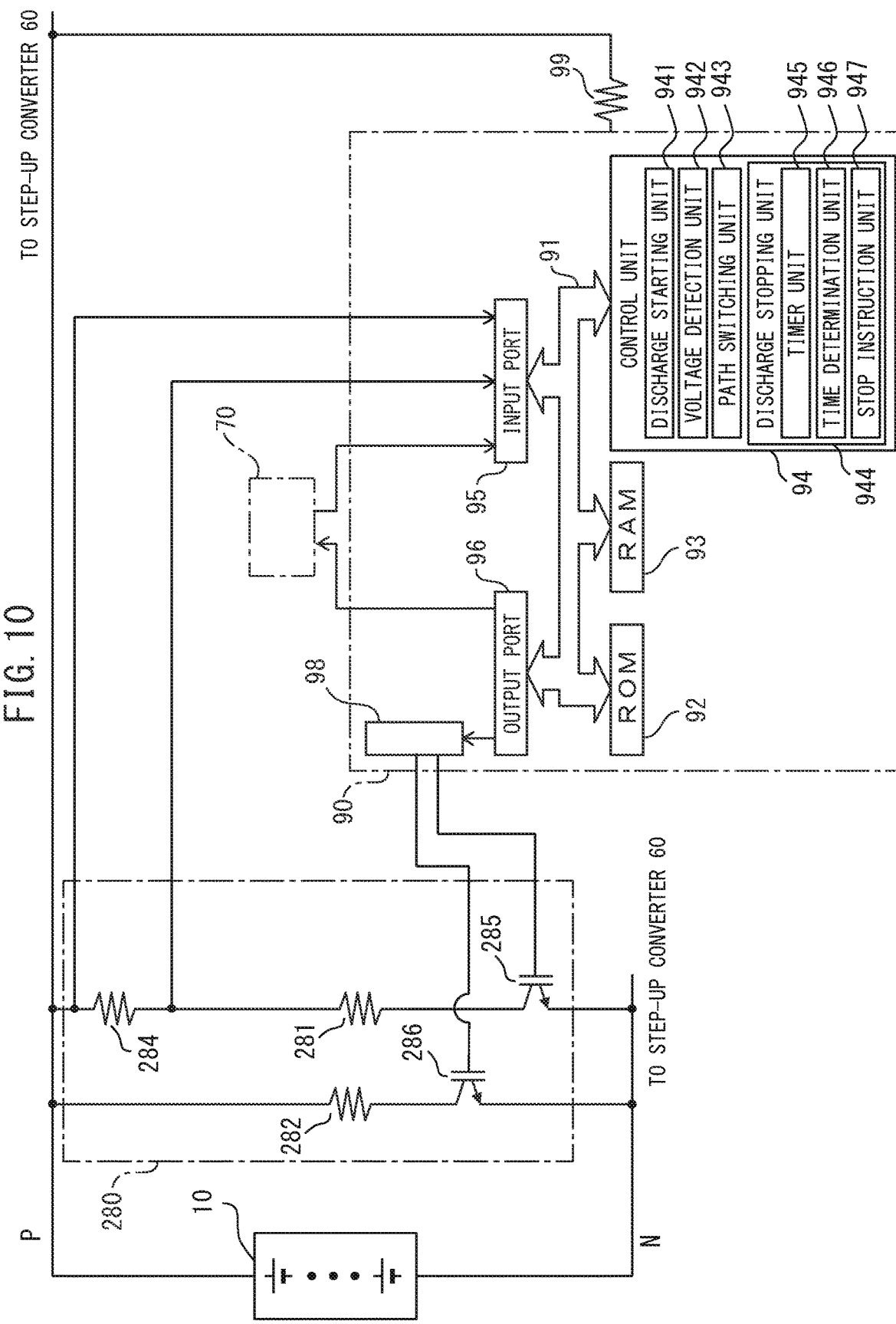
FIG. 10 is a detailed circuit block diagram of a discharge circuit and a discharge control circuit of a second modification example of the fuel cell system.

FIG. 10 is a detailed circuit block diagram of a discharge circuit and a discharge control circuit of a second modification example of the fuel cell system 1.

In the modification example illustrated in FIG. 10, a discharge circuit 280 is arranged in place of the discharge circuit 80 explained with reference to FIG. 4, FIG. 5, etc. The discharge circuit 280 has a first resistance element 281, a second resistance element 282, a fourth resistance element 284, which is a voltage detection element, a first switching element 285, and a second switching element 286. One end of the first resistance element 281 is electrically connected to the collector of the first switching element 285 and the other end of the first resistance element 281 is electrically connected to one end of the fourth resistance element 184. One end of the second resistance element 282 is electrically connected to the collector of the second switching element 286 and the other end of the second resistance element 282 is electrically connected to the cathode of the fuel cell stack 10. The other end of the fourth resistance element 284 is electrically connected to the cathode of the fuel cell stack 10. The emitters of the first switching element 285 and the second switching element 286 are electrically connected to the anode of the fuel cell stack 10 and the gates of the first switching element 285 and the second switching element 286 are electrically connected to the output port 96 via the drive circuit 98. Each of the first resistance element 281 and the second resistance element 282 is formed so that the resistance value of the first resistance element 281 is greater than the resistance value of the second resistance element 282.

The processing flow of processing to perform discharge control in the modification example illustrated in FIG. 10 is the same as the processing flow in the modification example illustrated in FIG. 8 explained with reference to FIG. 9, and therefore detailed explanation is omitted here. In the discharge circuit 280, a first discharge path is formed by the first switching element 285 turning on and a second discharge path is formed by both the first switching element 285 and the second switching element 286 turning on. Because the second resistance element 282 whose resistance value is comparatively small is connected in parallel to the first resistance element 281, the combined resistance of the second discharge path that is formed by both the first switching element 285 and the second switching element 286 turning on is lower than the combined resistance of the first discharge path.

Figure 11:
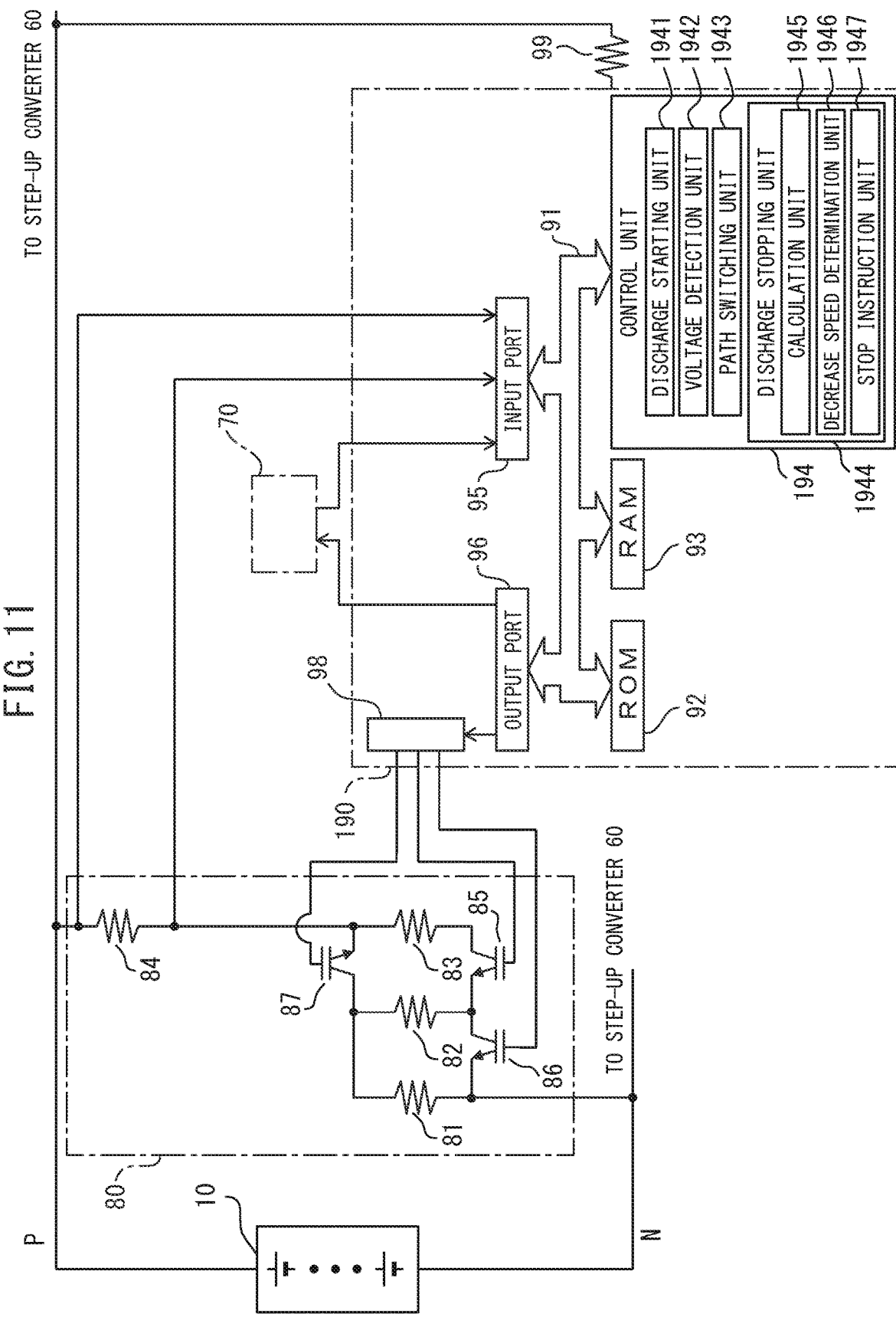
FIG. 11 is a detailed circuit block diagram of a discharge circuit and a discharge control circuit of a third modification example of the fuel cell system.

FIG. 11 is a detailed circuit block diagram of a discharge circuit and a discharge control circuit of a third modification example of the fuel cell system 1.

In the modification example illustrated in FIG. 11, a discharge control circuit 190 is arranged in place of the discharge control circuit 90 explained with reference to FIG. 4, FIG. 6, etc. The discharge control circuit 190 has a control unit 194 in place of the control unit 94. The control unit 194 has a discharge starting unit 1941, a voltage detection unit 1942, a path switching unit 1943, and a discharge stopping unit 1944. The discharge stopping unit 1944 has a calculation unit 1945, a decrease in speed determination unit 1946, and a stop instruction unit 1947. Each of these units controlled by the control unit 194 is a function module packaged by a program that is executed on the processor controlled by the control unit 194. Alternatively, each of these units controlled by the control unit 194 may be packaged in the discharge control circuit 190 as an independent integrated circuit, a microprocessor, or firmware.

Figure 12:
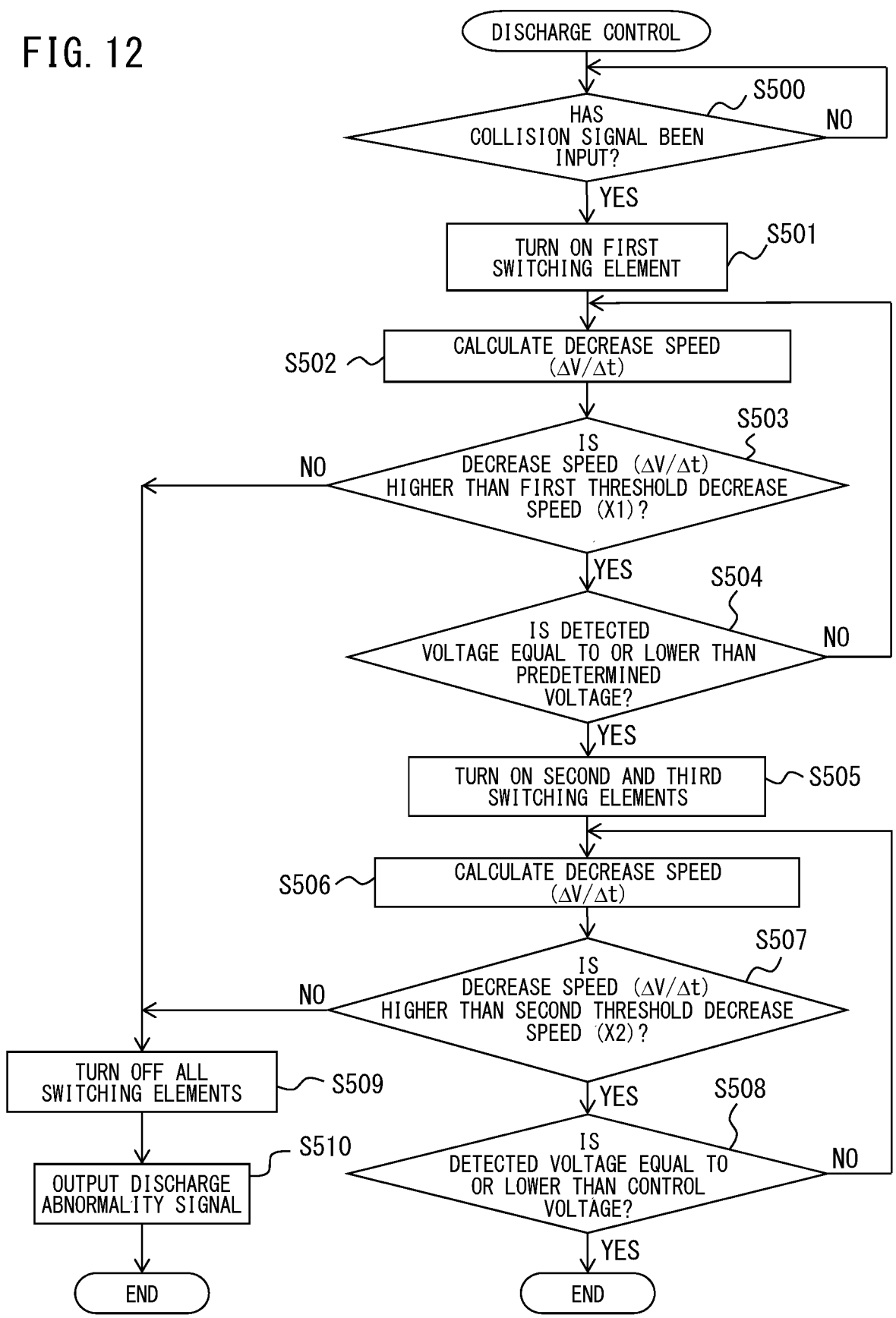
FIG. 12 is a flowchart illustrating a processing flow for performing discharge control in the modification example illustrated in FIG. 11.

FIG. 12 is a flowchart illustrating a processing flow of processing to perform discharge control in the modification example illustrated in FIG. 11.

The processing at each of S500, S501, S504, S505, and S510 is the same as the processing at each of S300, S301, S304, S305, and S307 explained with reference to FIG. 6, and therefore detailed explanation is omitted here. When the processing proceeds to S502, the calculation unit 1945 calculates a decrease in speed of the detected voltage ($\Delta V/\Delta t$). The sign of the decrease in speed of the detected voltage ($\Delta V/\Delta t$) to be calculated is taken to be positive in the direction in which the detected voltage decreases, and therefore the decrease in speed takes a positive value when the detected voltage decreases, and the decrease in speed takes a negative value when the detected voltage increases. Next, the decrease in speed determination unit 1946 determines whether the decrease in speed of the detected voltage ($\Delta V/\Delta t$) is higher than a first threshold decrease in speed (X1) or not (S503). The first threshold decrease in speed (X1) is proportional to the decrease in speed of the output voltage of the fuel cell stack 10. In one example, the decrease in speed of the output voltage of the fuel cell stack 10 corresponding to the first threshold decrease in speed (X1) is 100 V per second. If the decrease in speed of the detected voltage ($\Delta V/\Delta t$) is determined to be higher than the first threshold decrease in speed (X1), the processing proceeds to S504. If the decrease in speed of the detected voltage ($\Delta V/\Delta t$) is determined to be lower than the first threshold decrease in speed (X1), the processing proceeds to S509. After determining that the detected voltage that is detected after the unit time has elapsed has decreased from the detected voltage detected previously, the decrease in speed determination unit 1946 compares the decrease in speed of the detected voltage ($\Delta V/\Delta t$) from the previous detection with the first threshold decrease in speed (X1). If the decrease in speed of the detected voltage is lower than the first threshold decrease in speed (X1), the discharge control circuit 190 outputs a discharge abnormality signal (S510) as well as turning off the first switching element 85.

When the processing proceeds to S506, the calculation unit 1945 calculates the decrease in speed of the detected voltage ($\Delta V/\Delta t$) and next, the decrease in speed determination unit 1946 determines whether the decrease in speed of the detected voltage ($\Delta V/\Delta t$) is higher than a second threshold decrease in speed (X2) or not (S507). In one example, the decrease in speed of the output voltage of the fuel cell stack 10 corresponding to the second threshold decrease in speed (X2) is 20 V per second. If the decrease in speed of the detected voltage ($\Delta V/\Delta t$) is determined to be higher than the second threshold decrease in speed (X2), i.e., the change in the detected voltage is determined to be abrupt, the processing proceeds to S508. If the decrease in speed of the detected voltage ($\Delta V/\Delta t$) is determined to be lower than the second threshold decrease in speed (X2), i.e., the change in the detected voltage is determined to be gradual, the processing proceeds to S509. When the processing proceeds to S508, after determining that the detected voltage that is detected after the unit time has elapsed has decreased from the detected voltage detected previously, the decrease in speed determination unit 1946 compares the decrease in speed of the detected voltage ($\Delta V/\Delta t$) with the predetermined second threshold decrease in speed (X2). If the decrease in speed of the detected voltage is lower than the second threshold decrease in speed, the discharge control circuit 190 outputs a discharge abnormality signal (S510) as well as turning off the first switching element 85 to the third switching element 87 (S509).

Figure 13:
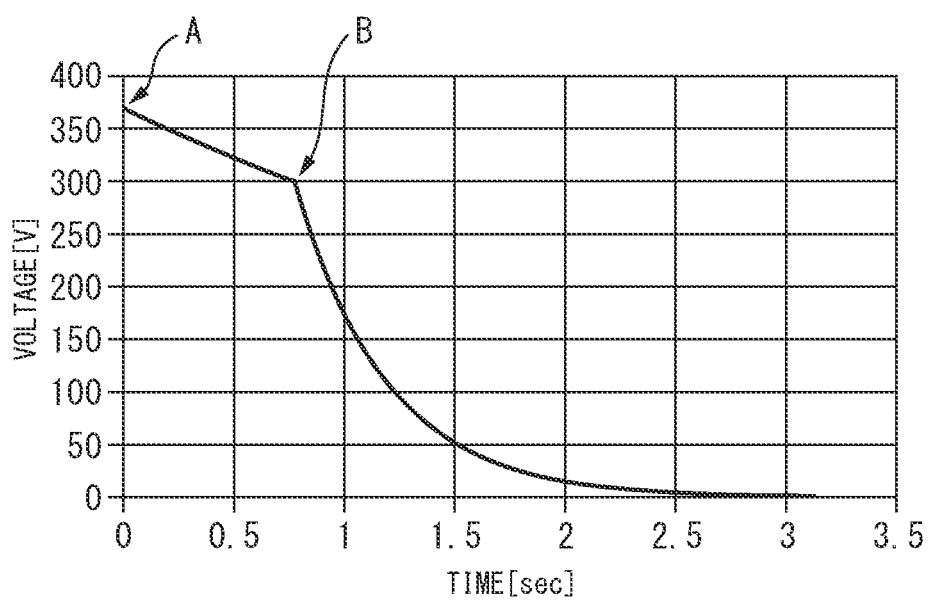
FIG. 13 is a diagram illustrating a change with the passage of time in the output voltage of a fuel cell stack in the discharge processing illustrated in FIG. 12.

FIG. 13 is a diagram illustrating a change with the passage of time in the output voltage of the fuel cell stack 10 in the discharge processing illustrated in FIG. 12. In FIG. 13, the horizontal axis represents the elapsed time after the discharge processing is started and the vertical axis represents the output voltage of the fuel cell stack 10. Further, in FIG. 13, the point in time indicated by arrow A indicates the point in time when the first switching element 85 turns on and the discharge processing starts and the point in time indicated by arrow B indicates the point in time when the second switching element 86 and the third switching element 87 further turn on.

At the point in time of arrow A, if a collision signal is input, the discharge starting unit 1941 turns on the first switching element 85 and forms a first discharge path in which the first resistance element 81 to the third resistance element 83 are connected in series. In the example illustrated in FIG. 13, the voltage before the collision signal is input is about 370 V. Next, if the detected voltage is determined to be equal to or lower than a predetermined voltage at the point in time of arrow B, the path switching unit 1943 turns on the second switching element 86 and the third switching element 87 and forms a second discharge path in which the first resistance element 81 to the third resistance element 83 are connected in parallel. In the example illustrated in FIG. 13, the voltage at which the second switching element 86 and the third switching element 87 are turned on is about 300 V.

In the embodiments according to the present invention, when a collision signal is input, the discharge control circuit forms the first discharge path and starts discharge through the first discharge path. The discharge control circuit forms the second discharge path whose resistance value is smaller than the resistance value of the first discharge path and switches the discharge through the first discharge path to the discharge through the second discharge path, when the detected voltage that is detected is lower than the predetermined threshold voltage during the discharge through the first discharge path. The discharge control circuit may be quickly discharged power from the fuel cell stack, as well as the resistance element may be prevented from being abnormal heating of at the time of discharge while suppressing the manufacturing cost by reducing the resistance value of the discharge path, when the detected voltage is lower than the predetermined threshold voltage.

Further, in the embodiments according to the present invention, the discharge control circuit turns off the switching element to shut off the discharge path, when the amount of decrease in the detected voltage per predetermined time is smaller than the threshold amount of decrease, and therefore the resistance element may be prevented from being burned out. Furthermore, the discharge control circuit also outputs a discharge abnormality signal, and therefore it may notify an operator of a collided vehicle that the discharge processing of the fuel cell stack has not been performed normally.

In the embodiments according to the present invention, the discharge control circuit forms the discharge path through which power generated in the fuel cell stack is discharged, when a collision signal indicating that a vehicle collision is detected is input. However, the discharge control circuit may form a discharge path through which power generated in the fuel cell stack is discharged, when another discharge instruction signal indicating instructions to discharge power generated in the fuel cell stack is input, such as a collision risk signal indicating that the vehicle may collide is strong. For example, the system control circuit 70 may determine whether a vehicle will collide with an obstacle based on distance information indicating the distance between the obstacle located ahead of the vehicle and the vehicle, and speed information indicating the speed of the vehicle, and to output a collision risk signal, when determining that the vehicle will collide with the obstacle.

Further, in the embodiments according to the present invention, although the discharge control circuit switches the discharge path that is formed in the discharge circuit from the first discharge path to the second discharge path based on the detected voltage that is detected via the fourth resistance element, the discharge control circuit may use a detected voltage that is detected by using a current detection coil configured to detect a current that flows through the wire of the discharge path, a shunt resistor, etc.

Furthermore, if the resistance value of the first resistance element 81 to the third resistance element 83 of the discharge circuit 80 is the same, the amount of generated heat of the resistance element is uniform, and therefore although it is preferable for the first resistance element 81 to the third resistance element 83 to be the same, the resistance values of the first resistance element 81 to the third resistance element 83 may be different. The first resistance element 181 and the second resistance element 182 of the discharge circuit 180, and the first resistance element 281 and the second resistance element 282 of the discharge circuit 280 are formed so that the resistance values of the first resistance elements 181 and 281 are greater than the resistance values of the second resistance elements 182 and 282. However, the resistance elements may be formed so that the resistance value of the first resistance elements 181 and 281 and the resistance value of the second resistance elements 182 and 282 are equal to each other, or so that the resistance values of the first resistance elements 181 and 281 are smaller than the resistance values of the second resistance elements 182 and 282.

From another viewpoint, the fuel cell system for a motor vehicle according to the present invention has:

a fuel cell stack configured to supply power to an electric motor for driving a vehicle, as well as generating power by an electrochemical reaction between a fuel gas and an oxidant gas;

a fuel gas supply unit configured to supply a fuel gas to the fuel cell stack;

an oxidant gas supply unit configured to supply an oxidant gas to the fuel cell stack;

a power generation stopping unit configured to stop generation of power in the fuel cell stack by controlling the oxidant gas supply unit to stop the supply of the oxidant gas to the fuel cell stack, as well as controlling the fuel gas supply unit to stop the supply of the fuel gas to the fuel cell stack when a discharge instruction signal indicating instructions to discharge power generated in the fuel cell stack is input;

a discharge unit configured to discharge power that is generated in the fuel cell stack when the discharge instruction signal is input;

a detection unit configured to detect a detected voltage corresponding to an output voltage of the fuel cell stack; and a control unit having a power generation stop abnormality signal unit configured to output a power generation stop abnormality signal indicating that the power generation of the fuel cell stack has not been stopped when the amount of decrease in the detected voltage per predetermined time is smaller than a threshold amount of decrease.

What is claimed is:

1. A fuel cell system for a motor vehicle, the fuel cell system comprising:

a fuel cell stack configured to supply power to an electric motor for driving a vehicle as well as generating power by an electrochemical reaction between a fuel gas and an oxidant gas;

a discharge circuit having a plurality of resistance elements and a plurality of switching elements switching connection relationships between the plurality of resistance elements, and capable of forming a plurality of discharge paths through which power generated in the fuel cell stack is discharged by the plurality of switching elements switching the connection relationships between the plurality of resistance elements; and a discharge control circuit configured to control turning on and off of the plurality of switching elements wherein the discharge control circuit has:

a discharge starting unit configured to start the discharge through a first discharge path by forming the first discharge path in the discharge circuit when a discharge instruction signal indicating instructions to discharge power generated in the fuel cell stack is input;

a voltage detection unit configured to detect a detected voltage corresponding to an output voltage of the fuel cell stack; and a path switching unit configured to form a second discharge path whose resistance value is smaller than the resistance value of the first discharge path and to switch the discharge through the first discharge path to discharge through the second discharge path when the detected voltage that is detected by the voltage detection unit is lower than a predetermined threshold voltage during the discharge through the first discharge path, wherein the discharge circuit has:

a first resistance element, to one end of which one terminal of the fuel cell stack is connected;

a second resistance element one end of which is connected to the other end of the first resistance element;

a third resistance element, to one end of which the other terminal of the fuel cell stack is connected;

a first switching element arranged between the other end of the second resistance element and the other end of the third resistance element;

a second switching element arranged between one end of the first resistance element and the other end of the second resistance element; and a third switching element arranged between one end of the second resistance element and one end of the third resistance element, the first discharge path is formed by the first resistance element, the second resistance element, and the third resistance element connected in series by turning on the first switching element while maintaining the second switching element and the third switching element in the off state, and the second discharge path is formed by the first resistance element, the second resistance element, and the third resistance element connected in parallel by turning on the first switching element, the second switching element, and the third switching element.

2. The fuel cell system for a motor vehicle according to claim 1, wherein the discharge control circuit further has a discharge stopping unit configured to output a discharge abnormality signal indicating that the discharge has not been performed normally as well as stopping the discharge by shutting off the first discharge path when an amount of decrease in the detected voltage per predetermined time is smaller than a threshold amount of decrease during the discharge through the first discharge path.

3. The fuel cell system for a motor vehicle according to claim 2, wherein
the discharge stopping unit has:
   a timer unit configured to measure an elapsed time from the start of the discharge;
   a time determination unit configured to determine whether the elapsed time measured by the timer unit is longer than a threshold time before the detected voltage is lower than the threshold voltage; and
   a stop instruction unit configured to output the discharge abnormality signal as well as shutting off the first discharge path when the time determination unit determines that the elapsed time is longer than the threshold time before the detected voltage is lower than the threshold voltage.

4. The fuel cell system for a motor vehicle according to claim 2, wherein
the discharge stopping unit has:
   a calculation unit configured to calculate a decrease in speed of the detected voltage;
   a decrease in speed determination unit configured to determine whether the decrease in speed of the detected voltage calculated by the calculation unit is higher than a predetermined threshold decrease in speed; and
   a stop instruction unit configured to output the discharge abnormality signal as well as shutting off the first discharge path when the decrease in speed determination unit determines that the decrease in speed of the detected voltage is lower than the predetermined threshold decrease in speed.

5. The fuel cell system for a motor vehicle according to claim 1, further comprising:
   an acceleration sensor configured to detect acceleration of the motor vehicle; and
   a system control circuit configured to determine whether the acceleration detected by the acceleration sensor is greater than a predetermined threshold acceleration, and to output the discharge instruction signal to the discharge control circuit when determining that the acceleration detected by the acceleration sensor is greater than the predetermined threshold acceleration.

6. The fuel cell system for a motor vehicle according to claim 5, wherein
the system control circuit performs processing to stop the supply of a fuel gas and an oxidant gas to the fuel cell stack when determining that the acceleration detected by the acceleration sensor is greater than the threshold acceleration.

7. A control method of a fuel cell system for a motor, the fuel cell system having:
a fuel cell stack configured to supply power to an electric motor for driving a vehicle as well as generating power by an electrochemical reaction between a fuel gas and an oxidant gas;
a discharge circuit having a plurality of resistance elements and a plurality of switching elements switching connection relationships between the plurality of resistance elements, and capable of forming a plurality of discharge paths through which power generated in the fuel cell stack is discharged by the plurality of switching elements switching the connection relationships between the plurality of resistance elements; and
a discharge control circuit configured to control turning on and off of the plurality of switching elements, the control method comprising:
starting, by the discharge control circuit, the discharge through a first discharge path by forming the first discharge path in the discharge circuit when a discharge instruction signal indicating instructions to discharge power generated in the fuel cell stack is input;
detecting, by the discharge control circuit, a detected voltage corresponding to an output voltage of the fuel cell stack; and
forming, by the discharge control circuit, a second discharge path whose resistance value is smaller than the resistance value of the first discharge path in the discharge circuit and switching the discharge through the first discharge path to discharge through the second discharge path when the detected voltage that is detected is lower than a predetermined threshold voltage during the discharge through the first discharge path, wherein
the discharge circuit has:
   a first resistance element, to one end of which one terminal of the fuel cell stack is connected;
   a second resistance element one end of which is connected to the other end of the first resistance element;
   a third resistance element, to one end of which the other terminal of the fuel cell stack is connected;
   a first switching element arranged between the other end of the second resistance element and the other end of the third resistance element;
   a second switching element arranged between one end of the first resistance element and the other end of the second resistance element; and
   a third switching element arranged between one end of the second resistance element and one end of the third resistance element,
the first discharge path is formed by the first resistance element, the second resistance element, and the third resistance element connected in series by turning on the first switching element while maintaining the second switching element and the third switching element in the off state, and
the second discharge path is formed by the first resistance element, the second resistance element, and the third resistance element connected in parallel by turning on the first switching element, the second switching element, and the third switching element.

* * * * *